Feb. 3, 1970 R. B. ROBROCK II 3,493,842
UNIPOLAR TO BIPOLAR CONVERTER
Filed June 12, 1968
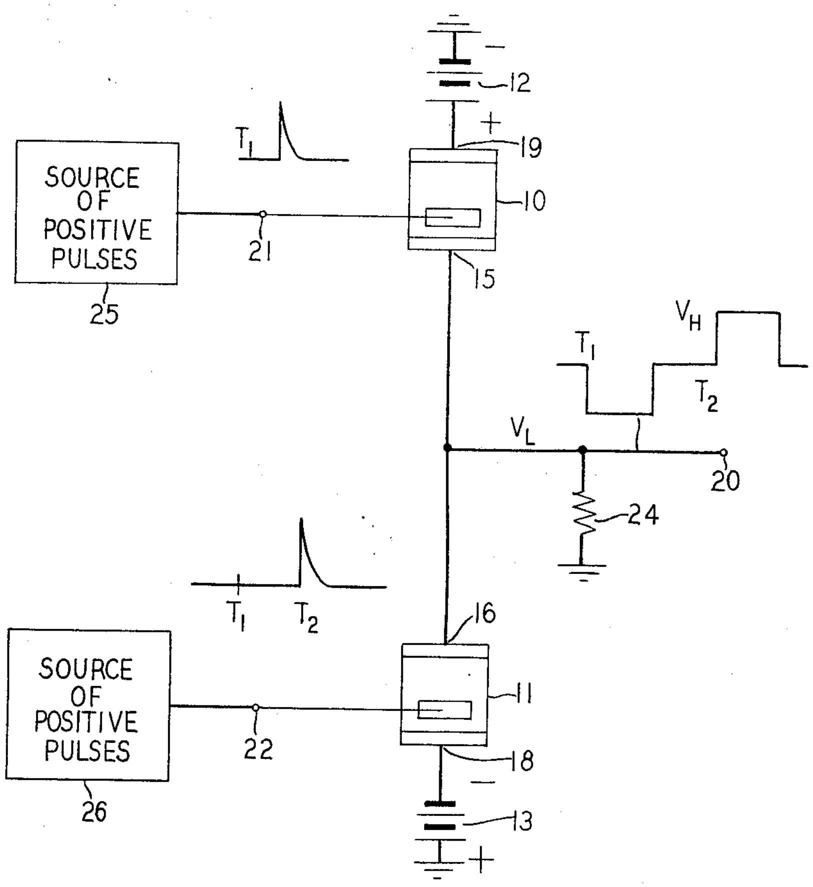
INVENTOR
R. B. ROBROCK II
BY Leonard A. Arnold
ATTORNEY

United States Patent Office

3,493,842

Patented Feb. 3, 1970

3,493,842

UNIPOLAR TO BIPOLAR CONVERTER

Richard B. Robrock II, Matawan Township, Monmouth County, N.J., assignor to Bell Telephone Laboratories, Incorporated, Murray Hill, N.J., a corporation of New York

Filed June 12, 1968, Ser. No. 736,465
Int. Cl. H02m *7/44, 7/68*
U.S. Cl. 321—45 2 Claims

ABSTRACT OF THE DISCLOSURE

A pair of two-valley bulk semiconductor devices is connected in series across a D.C. voltage source such that each of the devices is biased above the domain sustaining potential but below the oscillation sustaining potential. Each of the devices has an anode and a cathode and a third terminal bonded to the semiconductor structure between the anode and the cathode. Positive going input pulses which are to be regenerated as negative going output pulses are connected to the third terminal of a first of the devices, while positive going input pulses which are to be regenerated as positive going output pulses are applied to the third input terminal of a second of the devices. The presence of a positive input pulse at the third terminal of a device causes domain nucleation in that device which effects a sharp reduction in device current. As a result the voltage at the common junction of the two devices is a negative going pulse in response to the introduction of a positive pulse at the third terminal of the first device and a positive pulse in response to the introduction of a positive pulse at the third terminal of the second device. The width of each output pulse is specified by the transit time of the domain.

BACKGROUND OF THE INVENTION

This invention relates to circuit arrangements which employ as the active device any bulk semiconductor which exhibits the phenomenon of domain nucleation and propagation. The mechanism for this observed phenomenon is believed to result from the carriers in such materials exhibiting negative incremental mobility over a range of applied electric field. The source of this negative incremental mobility is vastly different from one material to the next. In gold doped Ge it may be attributed to a field dependent trapping effect, in CdS to phonon-electron interaction, while in GaAs, InP, CdTe, ZnSe and others it is believed to be the result of an intervalley scattering mechanism. The basic theory of these devices is set forth in detail in a series of papers in the January 1966 IEEE, Transactions on Electron Devices, volume ED–13, number 1, and September 1967 IEEE, Transactions on Electron Devices, volume ED–14, No. 9.

As set forth in the papers mentioned above, when an increasing voltage is applied to opposite ends of a suitable sample of a bulk semiconductor, such as n-type gallium arsenide, the average current in the sample increases almost linearly with voltage until a critical value is reached at which point the current drops sharply to a fraction of its maximum value. Above this critical voltage the average current in the sample remains essentially constant. In addition, in this range of reduced current the instantaneous waveform is found to oscillate periodically at a frequency related to the sample length. The critical voltage at which the drop in current in the sameple takes place and at which oscillations are initiated is termed the threshold voltage, $V_T$.

Present theory holds that these oscillations result from the nucleation of domains in a region near the negative electrode (cathode) and the propagation of these domains toward the positive electrode (anode). Subsequent to the phenomenon of nucleation, a domain grows to a stable shape and continues to drift towards the positive electrode even if the applied applied voltage is lowered, as long as this voltage remains above a minimum value which is termed the domain sustaining voltage, $V_{DS}$. If the applied voltage exceeds a value known as the oscillation sustaining voltage, $V_{OS}$, then the arrival of a domain at the anode results in the nucleation of a new domain near the cathode. The continued nucleation, propagation, and dissolution of domains produces coherein oscillations in the current waveform. If the applied voltage, however, is less than $V_{OS}$ but greater than $V_{DS}$, then the dissolution of a domain at the anode returns the device to its original ohmic state.

It has been found that in addition to initiating domain nucleation by means of a voltage applied across the anode and cathode of a bulk device, it is also possible to cause domain nucleation through the application of a positive potential to a third terminal of the device, physically located between the anode and the cathode. This third terminal may be a simple ohmic contact in which metal is physically bonded to the semiconductor structure or it may be a capacitive contact where the metalization is isolated from the semiconductor by an insulating layer. In this latter type of contact the signals applied to the third input terminal are inherently capacitively coupled to the semiconductor device. It has been found that regardless of the type of bonding employed in the third terminal that relatively low voltages are required at such a terminal to initiate domain nucleation even where the voltage between the anode and the cathode is substantially below the threshold voltage $V_T$. The apparent reason for this phenomenon is that a voltage applied to the third terminal need only increase the electric field over threshold in the region between this terminal and the cathode.

SUMMARY OF THE INVENTION

In accordance with a preferred embodiment of the present invention, a pair of two-valley bulk semiconductor devices is connected in series across a D.C. voltage source such that each of the devices is biased above the domain sustaining potential but below the oscillation sustaining potential. Each of the devices has an anode and a cathode and a third terminal bonded to the semiconductor structure between the anode and the cathode. Positive going input pulses which are to be regenerated as negative going output pulses are connected to the third terminal of a first of the devices, while positive going input pulses which are to be regenerated in that form are applied to the third input terminal of a second of the devices. The presence of a positive pulse at the third terminal of the first device causes domain nucleation in that device while the second device remains in the ohmic state. Similarly, the introduction of a positive pulse at the third input terminal of the second device causes domain nucleation in that device while the first remains in the ohmic state. Since the creation of a high-field domain effects a sharp reduction in device current, the voltage at the common junction of the second device is a negative going pulse in response to the introduction of a positive pulse at the third terminal of the first device and a positive going pulse in response to the introduction of a positive pulse at the third terminal of the second device. The width of each output pulse is specified by the transit time of the domain.

BRIEF DESCRIPTION OF THE DRAWING

The invention will be more fully comprehended from the following detailed description taken in conjunction with the drawing which is a schematic diagram of a unipolar to bipolar pulse converter embodying the invention.

DETAILED DESCRIPTION

The drawing shows in schematic diagram form the basic elements of a unipolar to bipolar converter embodying the present invention. A pair of substantially identical two-valley semiconductor devices 10 and 11 are connected in series between a source 12 of positive voltage and a source 13 of negative voltage. Each of the two-valley semiconductor devices 10 and 11 has an anode and a cathode and the cathode 15 of device 10 is directly connected to the anode 16 of device 11. The cathode 18 of device 11 is directly connected to negative voltage source 13 and similarly, the anode 19 of device 10 is directly connected to source 12 of positive voltage. The voltage provided by sources 12 and 13 is arranged to provide a bias voltage $V_B$ across each device greater than the domain sustaining voltage $V_{DS}$, but less than either the oscillation sustaining voltage $V_{OS}$ or threshold voltage $V_T$. Thus, when a domain is nucleated in either of the bulk semiconductor devices, that domain will persist until it reaches the positive contact, or anode, whereupon the device returns to the ohmic state.

The function of the apparatus shown in the drawing is to generate a negative going output pulse at output terminal 20 whenever a positive input pulse appears at input terminal 21, and to generate a positive going output pulse at output terminal 20 whenever a positive input pulse appears at input terminal 22. A source of positive pulses 25 is connected to input terminal 21 which is directly connected to a third input terminal of device 10 which may be either an ohmic contact directly bonded to the semiconductor between the cathode 15 and anode 19 or a contact formed by placing an insulating layer on the semiconductor to which a conductive surface is then bonded with terminal 21 directly connected to the metallic surface.

A similar contact is provided on device 11 and a source of positive pulses 26 is connected to input terminal 22 for direct application to the third contact.

The introduction of a positive pulse from source 25 causes domain nucleation in device 10 which substantially reduces the current flowing through device 10. At the same time device 11 is unaffected and remains biased in the ohmic region so that it has the characteristics of a resistor. Since the current in the series circuit from source 12 to source 13 is reduced as a result of domain nucleation in device 10 there is less voltage drop across device 11. As a result, the output voltage taken across a resistor 24 connected between terminal 21 and ground drops to a level $V_L$ as shown at the output terminal 20 in the drawing and remains at this level during the transit time of the domain from the cathode 15 in device 10 to its anode 19. In a similar manner a positive input pulse from source 26 causes device 11 to nucleate a domain at its cathode 18 so that the current in device 11 is substantially reduced while device 10 is maintained in the ohmic state. Since the series current in the path from source 12 to source 13 is reduced as a result of the nucleation of a domain in device 11, while device 10 is in its ohmic state, the voltage at the output terminal 20 rises to a level $V_H$ at which level it is maintained during the transit time of the domain from cathode 18 to anode 16.

Thus in accordance with the invention a unipolar to bipolar converter is realized using only two appropriate bulk semiconductor devices in a relatively simple circuit which is inherently capable of operating at extremely high speeds.

Various embodiments and modifications other than those described herein may be made by those skilled in the art without departing from the spirit and scope of the invention. For example, the length of device 10 may be different from the length of device 11 so that the positive and negative pulses generated at the output terminal 20 are of different widths which enables utilization apparatus to further discriminate between the pulses not only on the basis of their polarity, but also on the basis of their time duration.

What is claimed is:

1. A unipolar to bipolar pulse converter comprising in combination a pair of bulk semiconductor devices each having an anode and a cathode and a third terminal electrically coupled to an area on the semiconductor structure between the anode and the cathode, a direct connection between the cathode of a first of said devices and the anode of a second of said devices, means for applying the signals from a source of positive pulses to the third terminal of a first of said devices, means for applying signals from a second source of positive pulses to the third terminal of a second of said devices, means for providing a bias voltage across the anode and cathode of each of said devices greater than the domain sustaining voltage and less than the oscillation sustaining voltage of each of said devices, whereby said first device is excited to nucleate a domain when a positive pulse is applied to the third input terminal of said device, and said second device is excited to nucleate a domain when a positive pulse is applied to the third terminal of said device so that the voltage at the common junction of said cathode and said first device and the anode of said second device is reduced when said first device nucleates a domain and is increased when said second device nucleates a domain, and means for deriving for utilization the regenerated pulse train.

2. A unipolar to bipolar pulse converter comprising in combination a pair of bulk semiconductor devices each having an anode and a cathode and a third terminal electrically coupled to an area on the semiconductor structure between the anode and the cathode, a direct connection between the cathode of a first of said devices and the anode of a second of said devices, means for applying the signals from a source of positive pulses to the third terminal of a first of said devices, means for applying signals from a second source of positive pulses to the third terminal of a second of said devices, means providing a bias voltage across the anode of said first device and the catrode of said second device greater than the sum of the domain sustaining potentials of said devices but of magnitude less than the sum of the oscillation sustaining potentials such that in the absence of signals applied to the third terminal of a device the device is biased in the ohmic state, said biasing voltage being of predetermined relationship to the amplitude of the pulses from said first and said second sources so that said first device is excited to nucleate a domain when a positive pulse is applied to its third input terminal and said second device is excited to nucleate a domain when a positive pulse is applied to its third input terminal, and means for deriving for utilization the regenerated pulse train.

References Cited

RCA Technical Notes, "Amplifier Using Impact Ionization," Martin C. Steele, RCA TN No. 719, June 1967.

RCA Technical Notes, "Gunn Effect Device With Control Electrode," Lester F. Eastman, RCA TN No. 756, April 1968.

LEE T. HIX, Primary Examiner

J. M. SHOOP, Jr., Assistant Examiner

U.S. Cl. X.R.

307—262, 299; 317—235; 331—107